J. S. O. BROOKS.
Evaporating Pan.
No. 3,902. Patented Feb. 12, 1845.
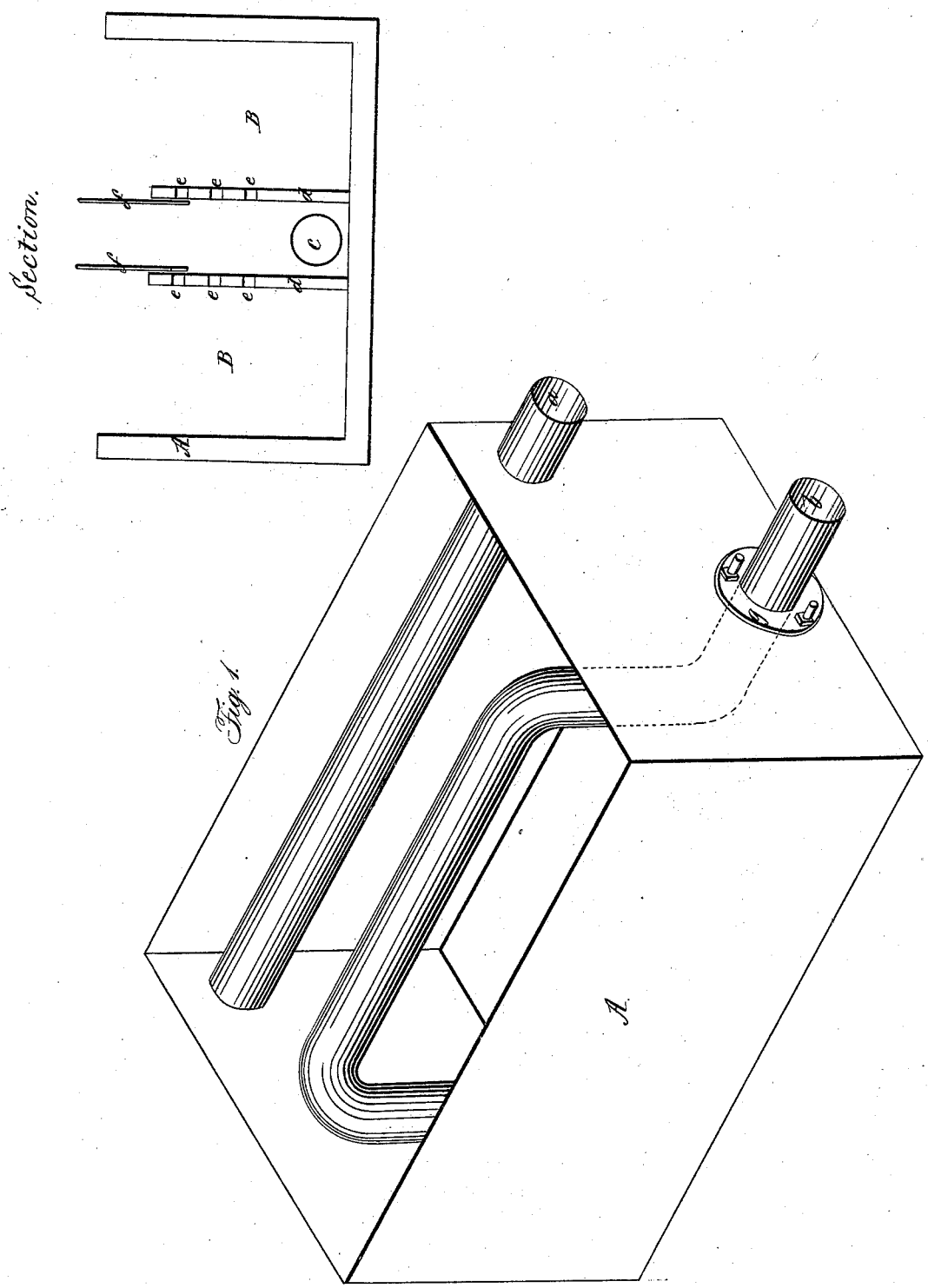

United States Patent Office.

JAMES S. O. BROOKS, OF KANAWHA COUNTY, VIRGINIA.

IMPROVEMENT IN SALT-MAKING.

Specification forming part of Letters Patent No. 3,902, dated February 12, 1845.

*To all whom it may concern:*

Be it known that I, JAMES S. O. BROOKS, of the county of Kanawha and State of Virginia, have made a new and useful improvement in the manner of applying heat to the brine in salt-granulating cisterns, for the purpose of producing larger and solider crystals of salt, commonly called "alum-salt," from the same quality of brine than is at present produced by the old process of applying heat to the brine in salt-granulating cisterns. The coarse solid alum-salt, it is well known, is a much more valuable article than a finer and porous article.

The nature of my invention consists in applying the heat to the surface of the brine, by which means I prevent the injurious currents that are caused by applying the heat to the bottom, which injurious currents and agitation of the brine in the cistern prevents the crystals from becoming as large and solid as is desirable.

I do hereby declare that the following is a full and exact description of the method I employ to apply artificial heat to the varying surface of the brine, at whatever point it may be between the top and bottom of the granulating-cistern, reference being had to the accompanying drawing, forming part of this specification.

The figure is a perspective elevation of a salt-granulating cistern constructed in any of the known forms.

A is the cistern. $b$ is a metallic heating-pipe, entering at the end of the cistern near the bottom of the brine. Immediately after passing through the end of the cistern it turns and rises in the direction of the dotted lines to the top of the cistern, then turning again it passes along parallel with the bottom of the same to the other end of the cistern, where it descends and passes out through the end of the cistern immediately opposite to where it entered. The pipe $b$ works in stuffing-boxes $g$, so that it may vibrate up and down, floating upon the surface of the brine and sufficiently immersed at the same time as to give the proper degree of heat. By passing a metallic pipe upon the surface of the brine, partially immersed, the low degree of heat so essential to the formation of alum-salt can be preserved among the brine in all parts of the granulating-cistern, and at the same time the injurious effects of the currents in the brine will be avoided. The pipe can be applied in other forms; but this is the most simple and better adapted to common use.

Having thus fully described my invention and the operation of the same, I would remark that I do not claim applying heat to the brine for the purpose of crystallizing the salt, as that has before been done, but I confine my claim to the mode herein described of applying the heat to the surface of the brine, as that surface rises or falls, by means of the revolving or floating pipe $b$, constructed and operating substantially as herein described. Its advantages are twofold—first, preserves a low degree of heat in all parts of the cistern; second, is a convenient mode of preventing the currents on the lower strata of brine.

J. S. O. BROOKS.

Witnesses:
ANDREW PARKS,
BENJ. H. SMITH.